(12) United States Patent
Guzelgoz et al.

(10) Patent No.: US 11,129,091 B2
(45) Date of Patent: Sep. 21, 2021

(54) METHODS AND APPARATUS FOR PROVIDING A RESOURCE ELEMENT (RE) IDENTIFICATION SYSTEM TO PROCESS RECEIVED UPLINK TRANSMISSIONS

(71) Applicant: Marvell International Ltd., Hamilton (BM)

(72) Inventors: Sabih Guzelgoz, San Jose, CA (US); Hong Jik Kim, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 186 days.

(21) Appl. No.: 16/421,917

(22) Filed: May 24, 2019

(65) Prior Publication Data

US 2019/0364491 A1 Nov. 28, 2019

Related U.S. Application Data

(60) Provisional application No. 62/676,821, filed on May 25, 2018.

(51) Int. Cl.
| | |
|---|---|
| *H04L 12/26* | (2006.01) |
| *H04W 48/16* | (2009.01) |
| *H04W 72/04* | (2009.01) |
| *H04L 5/00* | (2006.01) |
| *H04W 72/08* | (2009.01) |
| *H04B 17/336* | (2015.01) |
| *H04B 7/06* | (2006.01) |

(52) U.S. Cl.
CPC .......... *H04W 48/16* (2013.01); *H04B 7/0626* (2013.01); *H04B 17/336* (2015.01); *H04L 5/0055* (2013.01); *H04W 72/0413* (2013.01); *H04W 72/0453* (2013.01); *H04W 72/085* (2013.01)

(58) Field of Classification Search
USPC ....... 370/229, 230, 241, 252, 328, 329, 330, 370/468, 487, 490, 522
See application file for complete search history.

(56) References Cited

U.S. PATENT DOCUMENTS

| | | | | |
|---|---|---|---|---|
| 9,325,451 | B1* | 4/2016 | Kerhuel | H04L 1/0054 |
| 2009/0116541 | A1* | 5/2009 | Farrokhi | H04B 17/345 |
| | | | | 375/136 |
| 2012/0106437 | A1* | 5/2012 | Seo | H04B 7/15542 |
| | | | | 370/315 |
| 2013/0208665 | A1* | 8/2013 | Baldemair | H04L 1/1861 |
| | | | | 370/329 |
| 2015/0172006 | A1* | 6/2015 | Wang | H04L 1/1812 |
| | | | | 370/329 |
| 2017/0339690 | A1* | 11/2017 | Damnjanovic | H04W 72/0413 |
| 2019/0081760 | A1* | 3/2019 | Ren | H04L 1/0073 |
| 2019/0098620 | A1* | 3/2019 | Guo | H04W 72/06 |

* cited by examiner

*Primary Examiner* — Nguyen H Ngo
(74) *Attorney, Agent, or Firm* — JW Law Group; James M. Wu (57) ABSTRACT

Methods and apparatus for providing a resource element identification system to process received uplink transmissions. In an embodiment, a method is provided that includes receiving one or more symbols from an uplink transmission. Each symbol comprises resource elements. The method also includes categorizing the resource elements into a plurality of categories to generated categorized resource elements, and forwarding the categorized resource elements to downstream processing functions.

16 Claims, 5 Drawing Sheets

METHODS AND APPARATUS FOR PROVIDING A RESOURCE ELEMENT (RE) IDENTIFICATION SYSTEM TO PROCESS RECEIVED UPLINK TRANSMISSIONS

CLAIM TO PRIORITY

This application claims priority from U.S. Provisional Application No. 62/676,821, filed on May 25, 2018, and entitled "METHOD AND APPARATUS FOR PROCESSING CONTROL INFORMATION DURING WIRELESS DATA TRANSMISSION," which is incorporated by reference herein in its entirety.

FIELD

The exemplary embodiments of the present invention relate to operation of a telecommunications network. More specifically, the exemplary embodiments of the present invention relate to receiving and processing data streams using a wireless telecommunication network.

BACKGROUND

With a rapidly growing trend of mobile and remote data access over a high-speed communication network such as Long Term Evolution (LTE), fourth generation (4G), fifth generation (5G) cellular services, accurately delivering and deciphering data streams become increasingly challenging and difficult. The high-speed communication network, which is capable of delivering information includes, but is not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

In 5G systems, reference signals, data, and uplink control information (UCI) may be included in uplink transmissions from user equipment. The reference signals (RS) are used to estimate channel conditions or for other purposes. However, the reference signals are mixed in with data so that the reference signals must be accounted for when the data and/or UCI information is processed. For example, when processing resource elements (REs) received in an uplink transmission, special processing may be needed to skip over resource elements that contain reference signals. Even if the reference signals are set to zero or empty, their resource elements still need to be accounted for when processing the received data.

Therefore, it is desirable to have a system that enables efficient processing of data and UCI information received in uplink transmissions.

SUMMARY

In various exemplary embodiments, methods and apparatus are provided for a resource element identification (REI) system that enables fast and efficient processing of received 4G and/or 5G uplink transmissions. In various exemplary embodiments, methods and apparatus are provided for indexing, identifying, and categorizing resource elements received in uplink transmissions. In one aspect, an information stream is received that contains reference signals, data, and uplink control information. After extracting the reference signals from the information stream, the resulting symbols will comprise resource elements containing either all data or data multiplexed with UCI information. For example, the reference signals are only multiplexed with data and therefore when the reference signals are removed only data remains in those symbols. In an embodiment, the UCI information comprises hybrid automatic repeat request ("HARQ") acknowledgements ("ACK"), first channel state information ("CSI1"), and second channel state information (CSI2).

In an embodiment, an RE identifier indexes and categorizes each RE of the received uplink symbols into one of three categories. For example, category 0 is data or CSI2 information, category 1 is ACK information, and category 2 is CSI1 information. After storing the categorized REs in an array, the array is forwarded to a soft demapper that provides special treatment when predefined conditions are met. In one embodiment, the categorized REs are also forwarded to a descrambler that provides scrambling code modification when predefined conditions are met. In one embodiment, the categorized REs are forwarded to a UCI combiner/extractor for combining one or more REs to produce UCI information. In one example, the categorized REs are forwarded to a signal to noise plus interference ratio ("SINR") calculator that calculates SINR values.

In an embodiment, a method is provided that includes receiving one or more symbols from an uplink transmission. Each symbol comprises resource elements. The method also includes categorizing the resource elements into a plurality of categories to generated categorized resource elements, and forwarding the categorized resource elements to downstream processing functions.

In an embodiment, an apparatus is provided that includes an input interface that receives one or more symbols. Each symbol comprises resource elements. The apparatus also comprises a categorizer that categorizes the resource elements into a plurality of categories to generate categorized resource elements. The apparatus also comprises an output interface that outputs the categorized resource elements to downstream processing functions.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Aspects of the present invention are described below in the context of methods and apparatus for processing uplink information received in a wireless transmission.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

In various exemplary embodiments, methods and apparatus are provided for identifying and categorizing resource elements received in uplink transmissions. In one aspect, an information stream is received that contains data and uplink control information. After extracting reference signals from the information stream, the remaining REs contain may contain ACK, CSI1, and CSI2 information. These REs are indexed and categorized. After storing the categorized REs in an array, the array is forwarded to a soft demapper for providing a special treatment when a predefined condition is met. In one embodiment, the REs are also forwarded to a descrambler for providing code modification, and a UCI combiner/extractor for combining one or more REs to extract UCI information. In one aspect, after forwarding the categorized REs to a SINR calculator, the SINR calculator generates associated SINR values.

Figure 1:
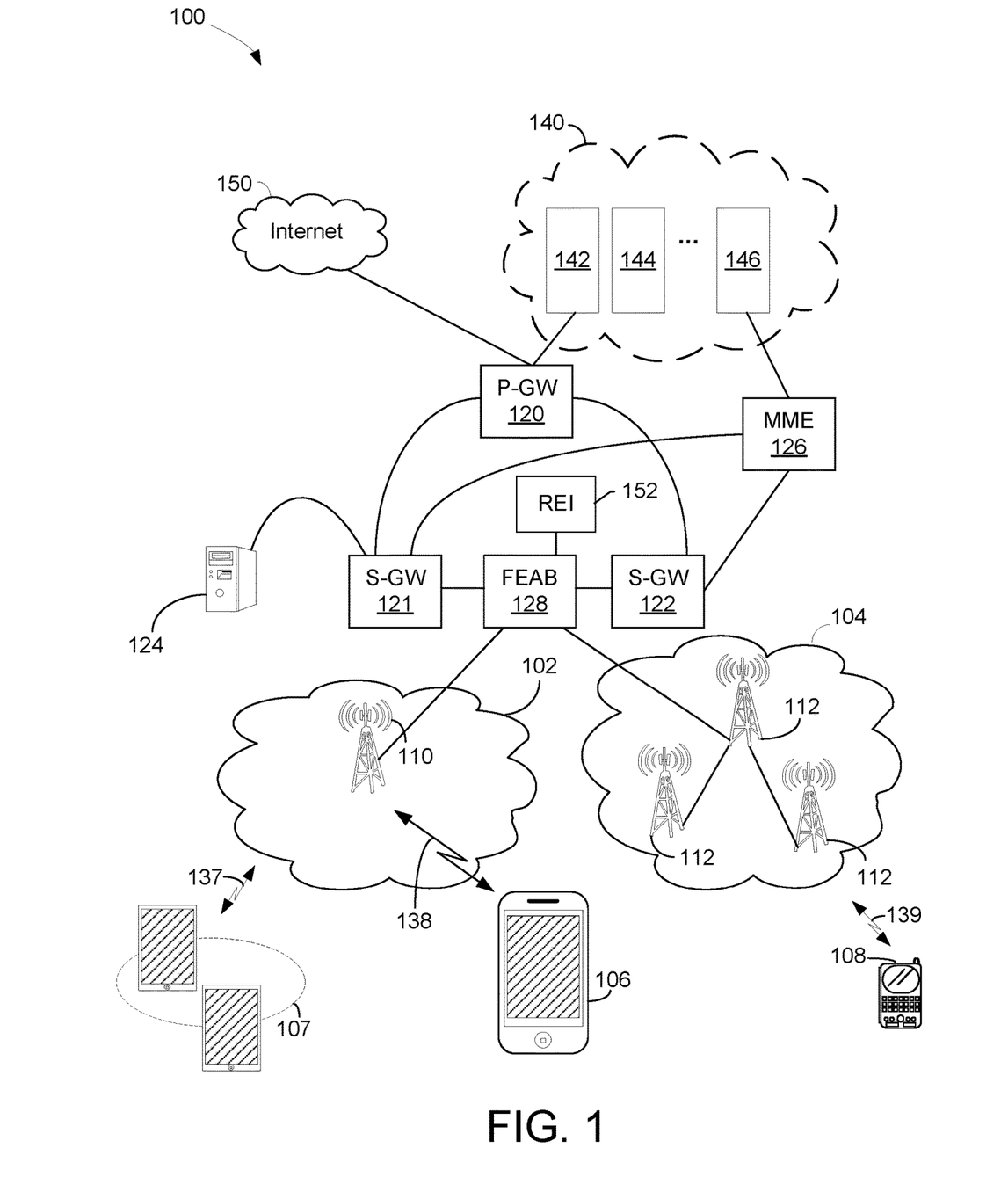
FIG. 1 shows a block diagram of a communication network in which resource elements received in uplink transmissions from user equipment are categorized by exemplary embodiments of a resource element identification system.

FIG. 1 shows a block diagram of a communication network 100 in which resource elements received in uplink transmissions from user equipment are categorized by exemplary embodiments of a resource element identification system 152. The network 100 includes packet data network gateway ("P-GW") 120, two serving gateways ("S-GWs") 121-122, two base stations (or cell sites) 102-104, server 124, and Internet 150. P-GW 120 includes various components 140, such as billing module 142, subscribing module 144, and/or tracking module 146 to facilitate routing activities between sources and destinations. It should be noted that the underlying concept of the exemplary embodiments would not change if one or more blocks (or devices) were added to or removed from network 100.

The network 100 may operate as a fourth generation ("4G"), Long Term Evolution (LTE), Fifth Generation (5G), New Radio (NR), or combination of 4G and 5G cellular network configurations. Mobility Management Entity (MME) 126, in one aspect, is coupled to base stations (or cell site) and S-GWs capable of facilitating data transfer between 4G LTE and 5G. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 4G and 5G packet core networks.

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

To improve efficiency and/or speed-up extracting uplink control information received from any of the user equipment, the REI system 152 is provided that operates to identify and categorize resource elements received in an uplink transmission. For example, in an embodiment, the REI system 152 operates to categorize resource elements received in PUSCH transmissions. For example, a first category includes REs that contain data or CSI2 information, a second category includes REs that contain ACK information, and a third category includes REs that contain CSI1 information. The categorized REs are passed to a soft demapper, descrambler, UCI combiner/extractor, and SINR calculator blocks. Each of these blocks may modify their operations based on the categories of the received REs. For example, the soft demapper provides special treatment for REs based on category. By adjusting the operation of these functional blocks based on the category of the received REs, the processing of the received uplink transmission can be performed with greater efficiency. A more detailed description of the REI system 152 is provided below.

Figure 2:
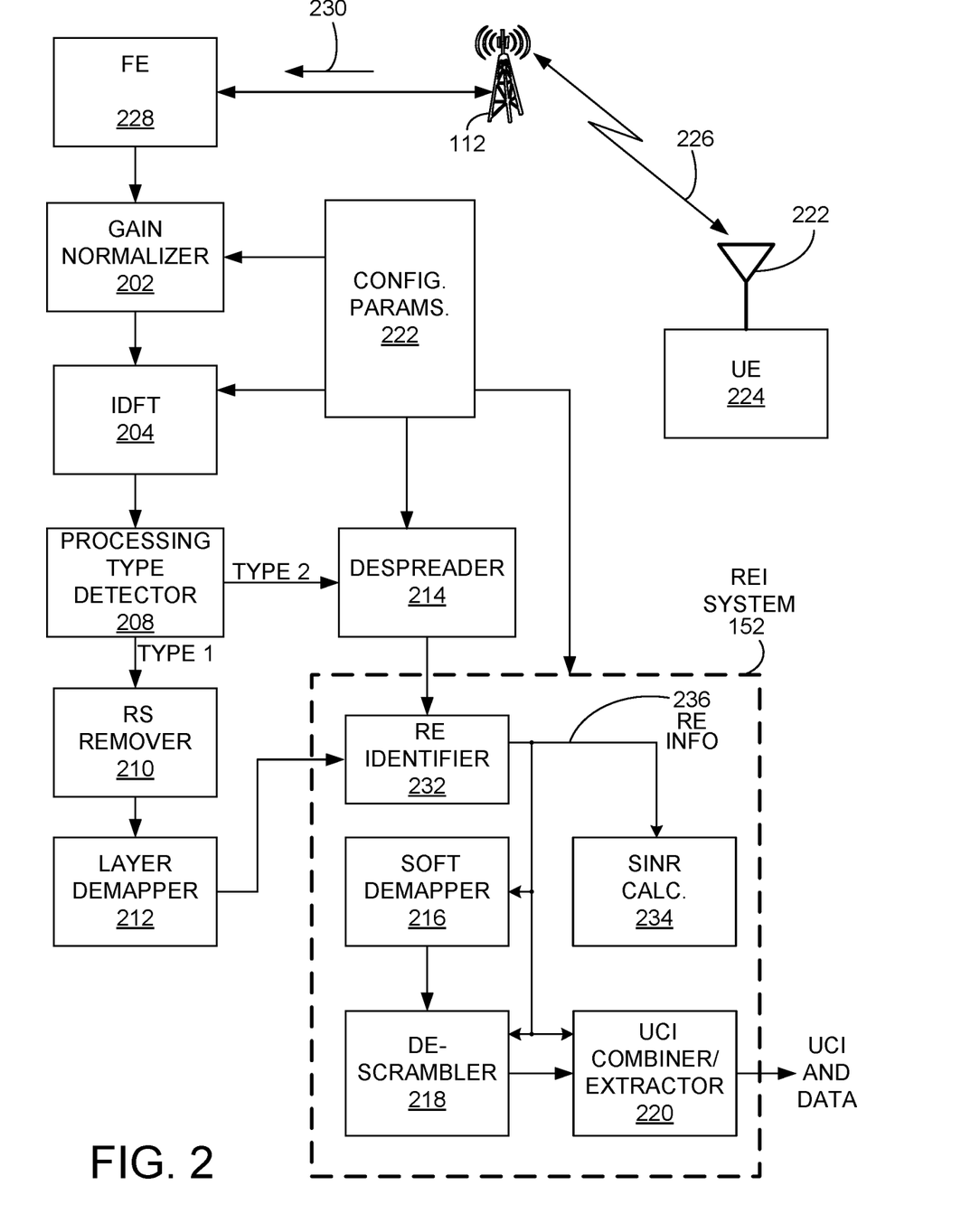
FIG. 2 shows an exemplary detailed embodiment of the resource element identification system shown in FIG. 1.

FIG. 2 shows an exemplary detailed embodiment of the REI system 152 shown in FIG. 1. FIG. 2 shows user equipment ("UE") 224 having antenna 222 that allows wireless communication with base station 112 through wireless transmissions 226. The UE 224 transmits uplink communications 230 that are received by base station front end (FE) 228. In an embodiment, the base station includes gain normalizer 202, inverse transform block (IDFT) 204, configuration parameters 222, processing type detector 208, RS remover 210, layer demapper 212, despreader 214, and the REI system 152. In an embodiment, the REI system 152 comprises, RE identifier 232, soft demapper 216, descrambler 218, combiner/extractor 220, and SINR calculator 234.

In an embodiment, the receiver of the uplink transmission processes 1 symbol at a time, which may come from multiple layers for NR, and the receiver of the uplink transmission processes the whole subframe or slot of a layer for LTE covering ims transmission time interval (TTI), 7-OFDM symbol (OS) short (s) TTI, and 2/3-OS sTTI. The modulation order can be derived as follows.
1. ($\pi$/2) BPSK for NR
2. ($\pi$/2) BPSK for LTE sub-PRB, QPSK, 16QAM, 64QAM, and 256QAM Furthermore, demapping rules apply to constellations as defined in LTE (4G) and/or NR (5G) Standards.

Configuration Parameters (Block 222)

In an embodiment, the configuration parameters 222 comprise multiple fields that contain parameters for use by multiple blocks shown in FIG. 2. For example, some of the configuration parameters 222 control the operation of the gain normalizer 202, IDFT 204 and REI system 152. In an embodiment, the configuration parameters 222 may indicate that the gain normalizer 202 and the IDFT 204 are to be bypassed. In an embodiment, the configuration parameters 222 are used by the soft demapper 216 to determine when to apply special treatment when soft demapping received resource elements. The configuration parameters 222 are also used to control the operation of the descrambler 218, UCI combiner/extractor 220, and/or the SINR calculator 234.

Gain Normalizer (Block 202)

In an embodiment, the gain normalizer 202 performs a gain normalization function on the received uplink transmission. For example, the gain normalizer 202 is applicable to LTE and NR DFT-s-OFDM cases. Input samples will be normalized as follows per data symbol per subcarrier with a norm gain value calculated per symbol as follows.

Gainnorm_out[Ds][sc]=(Gainnorm_in[Ds][sc])/(Norm_Gain[Ds])

IDFT (Block 204)

The IDFT 204 operates to provide an inverse transform to generate time domain signals. In an embodiment, the IDFT 204 is enabled only for LTE and NR DFT-s-OFDM and LTE sub-PRB. In an embodiment, the inputs and outputs are assumed to be 16 bits I and Q values, respectively. The DFT and IDFT operations are defined as follows.

$$DFT: X[k] = \frac{1}{\sqrt{N}} \sum_{n=0}^{N-1} x[n]W_N^{kn}$$

and $$IDFT: X[k] = \frac{1}{\sqrt{N}} \sum_{n=0}^{N-1} x[n]W_N^{-kn}$$

where $W_N = e^{-2\pi j/N}$.

Processing Type Detector (Block 208)

In exemplary embodiments, the processing type detector 214 detects the type of processing to be performed by the system. For example, this information may be detected from the configuration parameters 222. In an embodiment, the processing type detector 208 operates to detect one of two processing types, which cover the operation of the system as follows.
1. Type 1-5G NR DFT-s-OFDM
2. Type 1-5G NR CP-OFDM
3. Type 2-5G NR PUCCH Format 4

RS Remover (Block 210)

In an embodiment, the RS remover 210 operates during Type 1 processing to remove RS resource elements from the received data stream to produce a stream of data that is input to the layer demapper. For example, the RE locations of the RS symbols are identified and the data is re-written into one or more buffers to remove the RS symbols to produce an output that contains only data. In an embodiment, Type 1 processing includes RS/DTX removal, layer demapping with an interleaving structure, soft demapping, and descrambling. A benefit of removal of the RS REs before layering is to enable a single shot descrambling process without any disturbance in a continuous fashion with no extra buffering.

Layer Demapper (Block 212)

In an embodiment, data and signal to interference noise ratio (SINR) coming from multiple layers of a certain subcarrier will be transferred into a layer demapping circuit (not shown) via multi-threaded read DMA operation. In this case, each thread will point to the memory location of different layers for a certain symbol. The layer demapper 212 produces demapped data and multiple pSINR reports per layer. In an embodiment, for NR the DMRS/PTRS/DTX REs will be removed from the information stream prior to soft demapping for both I/Q and SINR samples.

Despreader (Block 214)

In an embodiment, the despreader 214 provides despreading Type 2 processing for PUCCH Format 4 only. Despreading comprises combining the repeated symbols along the frequency axis upon multiplying them with the conjugate of the proper spreading sequence. The spreading sequence index as well as the spreading type for combining the information in a correct way will be given by the configuration parameters 222. This process is always performed over 12 REs in total. The number of REs that will be pushed into subsequent blocks will be reduced by half or ¼th after despreading depending upon the spreading type. Combined results will be averaged and stored as 16-bit information before soft demapping.

REI System (Block 152)

In an embodiment, the REI system 152 comprises, the RE identifier 232, the soft demapper 216, the descrambler 218, the combiner/extractor 220, and the SINR calculator 234. During operation the REI system 152 categorizes resource elements and passes these categorized REs to the soft demapper 216 and one or more other blocks of the REI system 152. In an embodiment, the soft demapper 216 uses the categorized REs to determine when to apply special treatment to the soft demapping process.

Resource Element Identifier (Block 232)

In an embodiment, the RE identifier 232 operates to process a received information stream of resource elements to identify, index, and categorized each element. An index and categorization of each element (e.g., RE information 236) is passed to the soft demapper 216 and other blocks of the REI system 152. A more detailed description of the operation of the RE identifier 232 is provided below.

Figure 3:
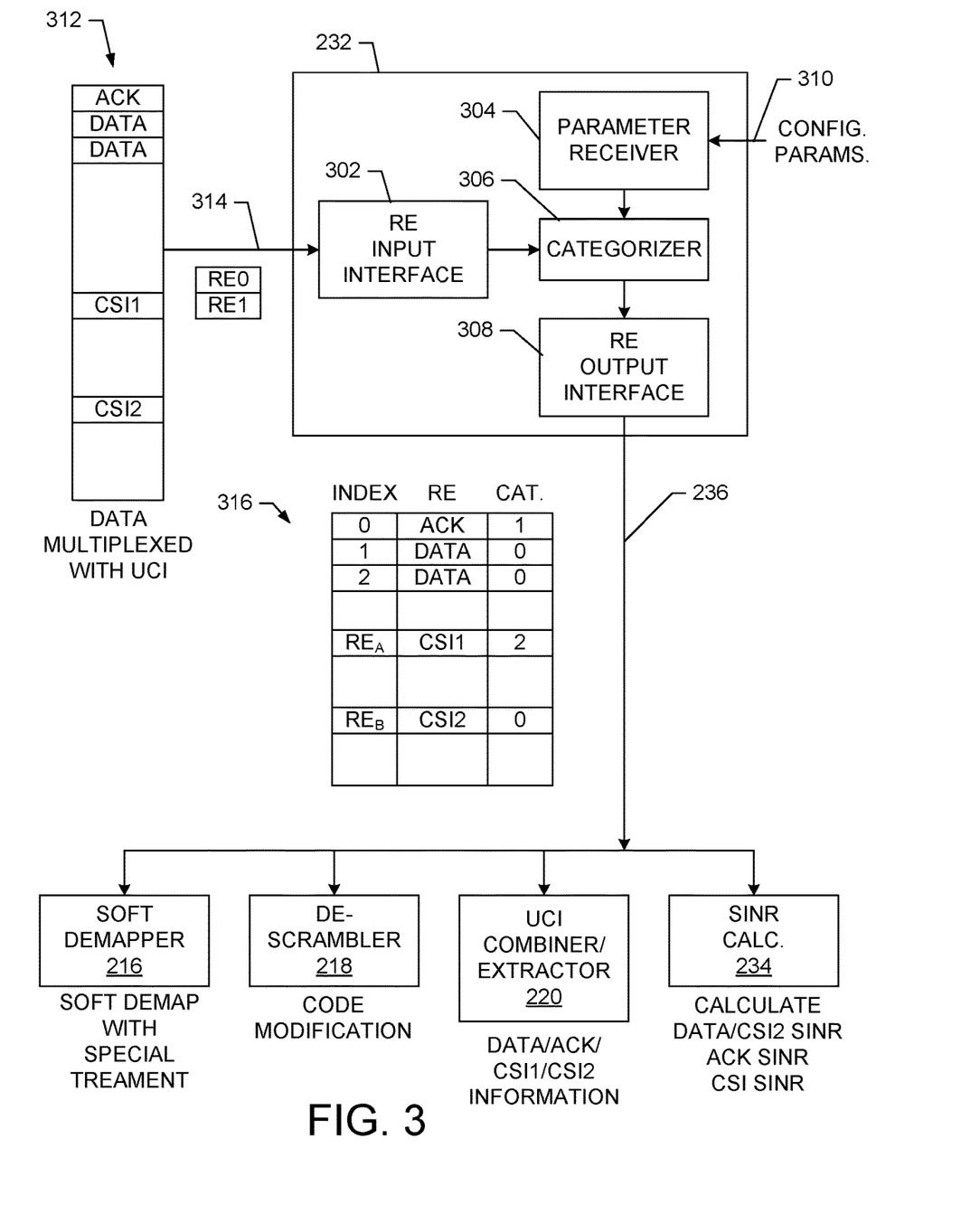
FIG. 3 shows a block diagram illustrating a detailed exemplary embodiment of an RE identifier block shown in FIG. 2.

FIG. 3 shows a block diagram illustrating a detailed exemplary embodiment of the RE identifier 232 shown in FIG. 2. As illustrated in FIG. 3, the RE identifier 232 comprises RE input interface 302, parameter receiver 304, categorizer 306, and RE output interface 308.

During operation, an uplink transmission is received and processed by the above described blocks to produce an information stream, such as the information stream 312. For example, the received uplink transmission is processed by at least one of the processing type detector 208, layer demapper 212 or the despreader 214. As a result, the information stream 312 does not contain any reference signals (RS) but contains data or data multiplexed with UCI information and this stream is input to the RE identifier 232.

The information stream 312, in one embodiment, includes information or data bits and UCI bits. In one example, the UCI bits, such as ACK bits, CSI1 bits, and/or CSI2 bits, are scattered throughout information stream 312. For instance, UCI bits are mixed with the data bits as illustrated.

In an embodiment, during 5G operation, the RE identifier 232 correctly identifies the RE indices of the UCI bits for soft demapper special treatment, descrambler code modification, and UCI combining/extraction as shown in FIG. 2. The RE indices of the UCI bits are also used for generating the SINR report values for ACK and CSI1 as well for NR CP-OFDM operation.

In an embodiment, the RE identification process will process 2 REs per cycle, indicated at 314. For example, the resource elements of the received stream 312 are received by the RE input interface 302, which provides the received information to the categorizer 306. The parameter receiver 304 receives parameters 310 from the configuration parameter block 222. The categorizer 306 uses these parameters to categorize the received resource elements and after categorizing the received REs, the categorizer 306 stores the categorized REs in an array, such as the array 316. In an embodiment, the identification of RE1 can be obtained based on multiple hypothesizes of RE0. Similarly, RE2 identification can be derived based on multiple hypothesizes of RE0 and RE1. The RE output interface 308 outputs the categorized REs to the soft demapper 216, descrambler 218, UCI combiner 220, and SINR calculator 234. In one aspect, the components of soft demapper 216, descrambler 218, UCI combiner 220, and SINR calculator 234 are interconnected for transferring certain information between the components.

In various embodiments, the soft demapper 216 provides special treatment to REs based on certain UCI categories. The descrambler 218 is capable of providing code modification based on certain UCI categories. The UCI combiner/extractor 220 is capable of combining DATA, ACK, CSI1 and/or CSI2 information. The SINR calculator 234 is capable of calculating data/CSI2 SINR, as well as other RE related SINRs, such as an ACK SINR and a CSI SINR.

Soft Demapper

The soft demapping principle is based on computing the log-likelihood ratio (LLR) of a bit that quantifies the level of certainty on whether it is logical zero or one. The Soft demapper 216 processes symbol by symbol and RE by RE within a symbol.

The soft demapping principle is based on computing the log-likelihood ratio (LLR) of a bit that quantifies the level of certainty on whether it is logical zero or one. Under the assumption of Gaussian noise, LLR for the i-th bit is given by:

$$LLR_i = \ln\left(\frac{P(bit_i = 0/r)}{P(bit_i = 1/r)}\right)$$

$$= \ln\left(\frac{\sum_j e^{-\frac{(x-c_j)^2}{2\sigma^2}}}{\sum_k e^{-\frac{(x-c_k)^2}{2\sigma^2}}}\right)$$

$$= \ln\left(\sum_j e^{-\frac{(x-c_j)^2}{2\sigma^2}}\right) - \ln\left(\sum_k e^{-\frac{(x-c_k)^2}{2\sigma^2}}\right)$$

where $c_j$ and $c_k$ are the constellation points for which i-th bit takes the value of 0 and 1, respectively. Note that for the gray mapped modulation schemes given in [R1], x may be taken to refer to a single dimension I or Q. Computation complexity increases linearly with the modulation order. A max-log MAP approximation has been adopted in order to reduce the computational complexity. Note that this approximation is not necessary for QPSK since its LLR has only one term on both numerator and denominator.

$$\ln\sum_m e^{-d_m} \cong \max(-d_m) = \min(d_m)$$

This approximation is accurate enough especially in the high SNR region and simplifies the LLR calculation drastically avoiding the complex exponential and logarithmic operations. Given that I and Q are real and imaginary part of input samples, the soft LLR is defined as follows for (π/2) BPSK, QPSK, 16QAM, 64QAM, and 256QAM, respectively.

In an embodiment, the soft demapper 216 includes a first minimum function component ("MFC"), a second MFC, a special treatment component ("STC"), a subtractor, and/or an LLR generator. A function of soft demapper 216 is to demap or ascertain soft bit information associated to received symbols or bit streams. For example, soft demapper 216 employs soft demapping principle which is based on computing the log-likelihood ratio (LLR) of a bit that quantifies the level of certainty as to whether it is a logical zero or one. To reduce noise and interference, soft demapper 216 is also capable of discarding one or more unused constellation points relating to the frequency of the bit stream from the constellation map.

The STC, in one aspect, is configured to force an infinity value as one input to the first MFC when the stream of bits is identified and a special treatment is needed. For example, a predefined control signal with a specific set of encoding categories such as ACK with a set of predefined encoding categories requires a special treatment. One of the special treatments, in one aspect, is to force infinity values as inputs to MFCs. For example, STC force infinity values as inputs to the first and the second MFCs when the stream of bits is identified as ACK or CSI1 with a predefined encoding category. The STC, in one instance, is configured to determine whether a special treatment (or special treatment function) is required based on received bit stream or symbols. In one aspect, the 1-bit and 2-bit control signals with predefined encoding categories listed in Table 1 require special treatments. It should be noted that Table 1 is exemplary and that other configurations are possible.

TABLE 1

| No. | Control Signal with Encoding Categories | Renamed Categories |
|---|---|---|
| 1 | $O^{ACK} = 1$ | ACK[1] |
| 2 | $O^{ACK} = 2$ | ACK[2] |
| 3 | $O^{CSI1} = 1$ | CSI1[1] |
| 4 | $O^{CSI1} = 2$ | CSI1[2] |

Descrambler (Block 218)

The descrambler 218 is configured to generate a descrambling sequence of bits or a stream of bits. For example, after generating a sequence in accordance with the input value, the descrambler determines whether sequence modification is needed for certain categories of control information received from the REI block 232. The stream of bits or sequence is subsequently descrambled to produce a set of descrambled soft bits.

Combiner/Extractor (Block 220)

The combiner/extractor 220 provides a combining and extracting function to combine descrambled soft bits from the descrambler 218 and extract Uplink Control Information. In an embodiment, the combiner/extractor modifies it operation based on categories received from REI block 232.

SINR Calculator (Block 234)

The SINR calculator 234 calculates SINR for per UCI type based on categories received from REI block 232.

Figure 4:
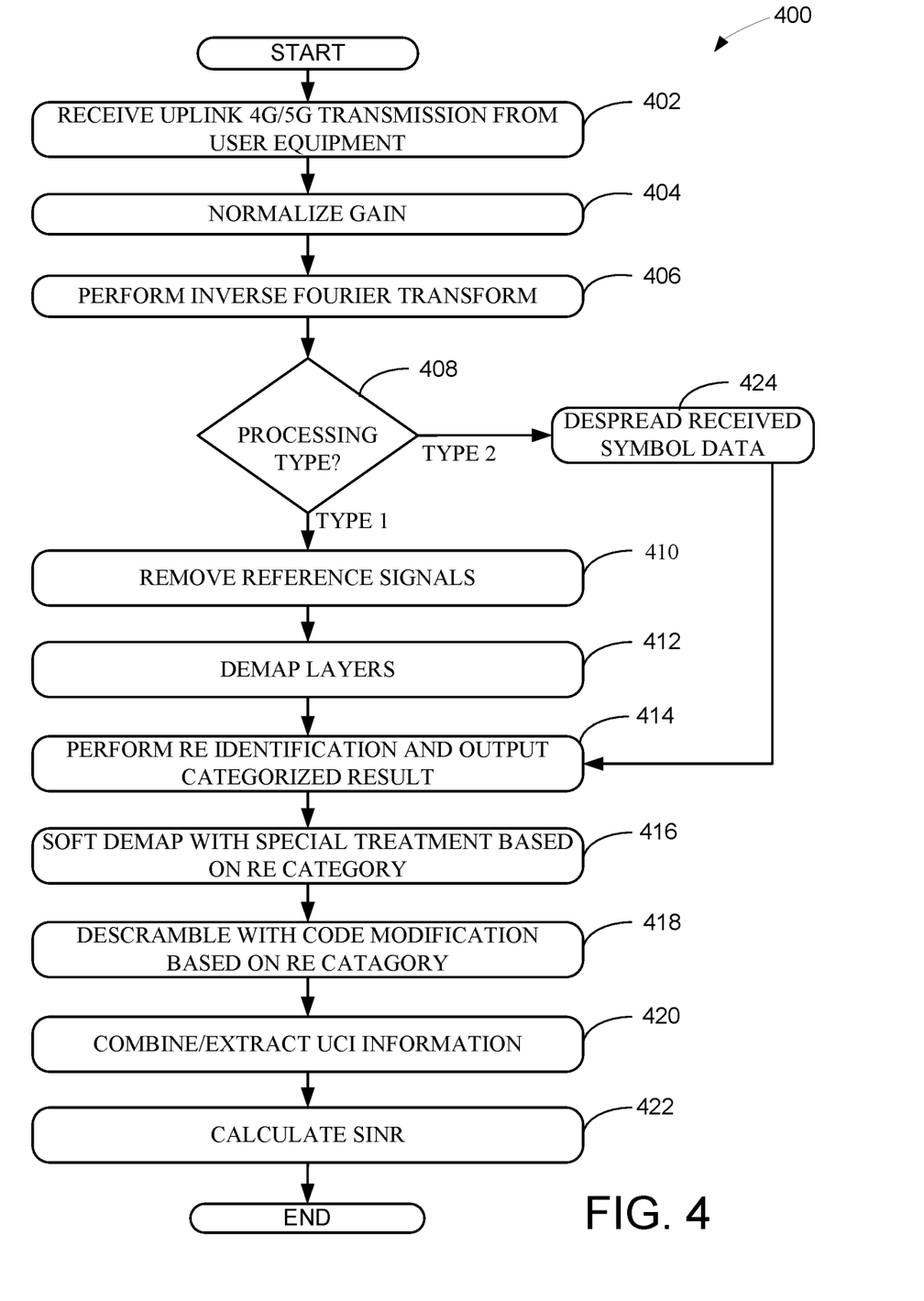
FIG. 4 shows an exemplary method for performing resource element categorization in accordance with exemplary embodiments of a resource element identification system.

FIG. 4 shows an exemplary method 400 for performing resource element categorization in accordance with exemplary embodiments of an REI system. For example, the method 400 is suitable for use with the REI system 152 shown in FIG. 2.

At block 402, uplink transmissions are received in a 5G communication network. For example, the uplink transmissions are received at the front end 228 shown in FIG. 2.

At block 404, gain normalization is performed. For example, the gain normalization is performed by the gain normalizer 202 shown in FIG. 2.

At block 406, an inverse Fourier transform is performed to obtain time domain signals. For example, this process is performed by the IDFT block 204 shown in FIG. 2.

At block 408, a determination is made as to a type of processing to be performed. For example, a description of two processing types is provided above. If a first type of processing is to be performed, the method proceeds to block 410. If a second type of processing is to be performed, the method proceeds to block 424. For example, this operation is performed by the processing type detector 208 shown in FIG. 2.

At block 424, when the processing type is Type 2, despreading is performed on the received resource elements. For example, this operation is performed by the despreader 214 shown in FIG. 2. The method then proceeds to block 414.

When the processing type is Type 1, the follow operations are performed.

At block 410, the reference signals are removed from the received resource elements. For example, resource elements containing RS/DTX are removed. This operation is performed by the RS remover 210 shown in FIG. 2.

At block 412, layer demapping is performed. For example, the resource elements without RS/DTX are layer demapped. This operation is performed by the layer demapper 212.

At block 414, RE identification and categorization is performed. For example, as illustrated in FIG. 3, the RE identifier 232 receives a stream of REs, categorizes the REs, and then outputs the array 316 in which the REs are indexed and include categorization values.

At block 416, soft demapping is performed. For example, the soft demapper 216 soft-demaps the REs with special treatment provided based on the categorization of the received REs. The soft demapper 216 produces a soft-demapped output that is input to the descrambler 218.

At block 418, descrambling is performed. For example, the descrambler 218 receives the soft demapped bits from the soft demapper 216 and generates descrambled bits. In an embodiment, based on the categorization of the REs, a modified descrambler code is used.

At block 420, combining and extraction of UCI information is performed. For example, the combiner/extractor 220 receives the descrambled bits, combines these bits, and extracts the UCI information.

At block 422, SINR calculations are performed to calculate data/CSI2, ACK, and CSI1 SINR values.

Thus, the method 400 operates to provide resource element identification and categorization in accordance with the exemplary embodiments. It should be noted that the operations of the method 400 can be modified, added to, deleted, rearranged, or otherwise changed within the scope of the embodiments.

Figure 5:
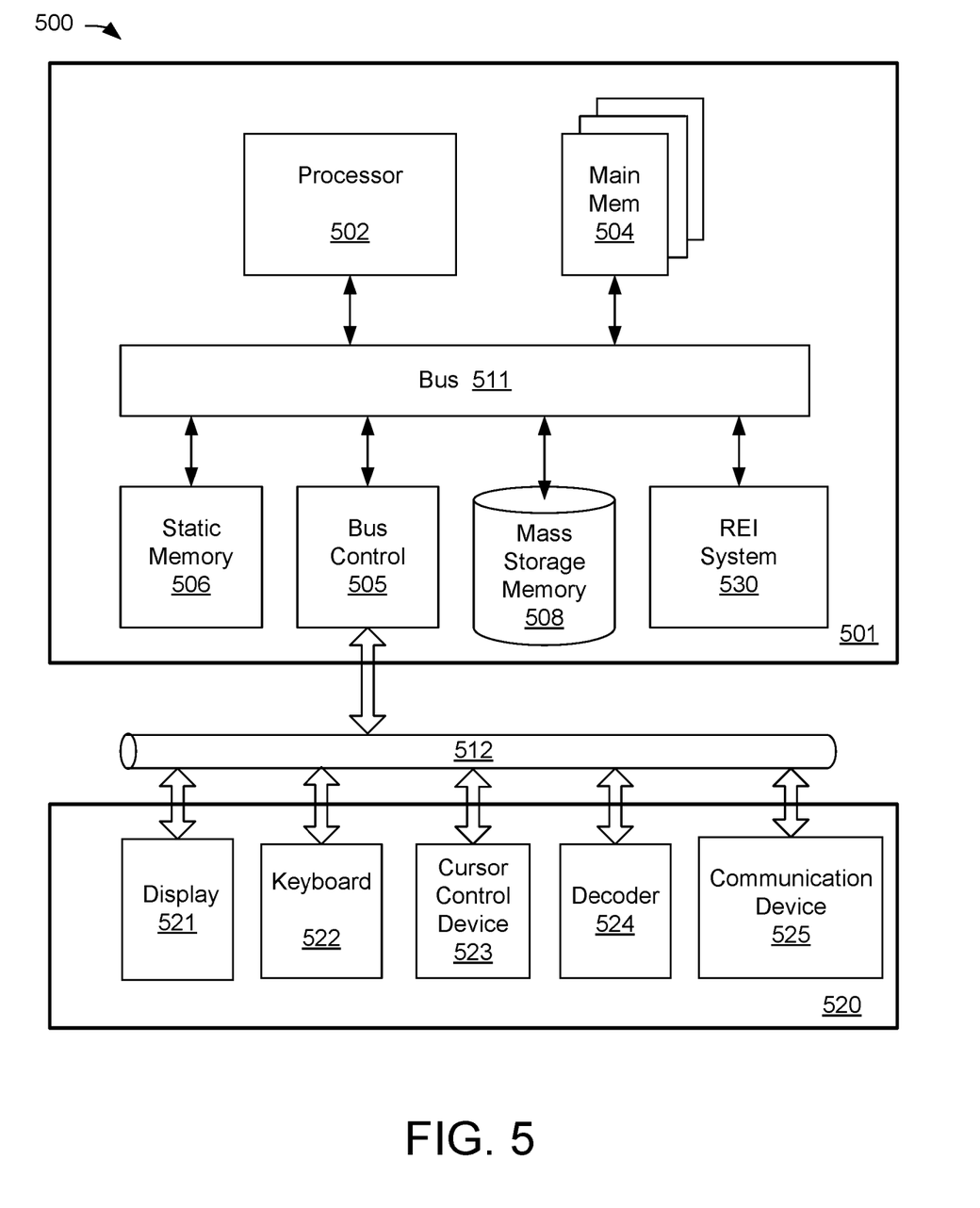
FIG. 5 shows a block diagram illustrating a processing system having an exemplary embodiment of a resource element identification system.

FIG. 5 shows a block diagram illustrating a processing system 500 having an exemplary embodiment of an REI system 530. It will be apparent to those of ordinary skill in the art that other alternative computer system architectures may also be employed.

The system 500 includes a processing unit 501, an interface bus 512, and an input/output ("IO") unit 520. Processing unit 501 includes a processor 502, main memory 504, system bus 511, static memory device 506, bus control unit 505, and mass storage memory 508. Bus 511 is used to transmit information between various components and processor 502 for data processing. Processor 502 may be any of a wide variety of general-purpose processors, embedded processors, or microprocessors such as ARM® embedded processors, Intel® Core™ 2 Duo, Core™ 2 Quad, Xeon®, Pentium™ microprocessor, AMD® family processors, MIPS® embedded processors, or Power PC™ microprocessor.

Main memory 504, which may include multiple levels of cache memories, stores frequently used data and instructions. Main memory 504 may be RAM (random access memory), MRAM (magnetic RAM), or flash memory. Static memory 506 may be a ROM (read-only memory), which is coupled to bus 511, for storing static information and/or instructions. Bus control unit 505 is coupled to buses 511-512 and controls which component, such as main memory 504 or processor 502, can use the bus. Mass storage memory 508 may be a magnetic disk, solid-state drive ("SSD"), optical disk, hard disk drive, floppy disk, CD-ROM, and/or flash memories for storing large amounts of data.

I/O unit 520, in one example, includes a display 521, keyboard 522, cursor control device 523, decoder 524, and communication device 525. Display device 521 may be a liquid crystal device, flat panel monitor, cathode ray tube ("CRT"), touch-screen display, or other suitable display device. Display 521 projects or displays graphical images or windows. Keyboard 522 can be a conventional alphanumeric input device for communicating information between computer system 500 and computer operators. Another type of user input device is cursor control device 523, such as a mouse, touch mouse, trackball, or other type of cursor for communicating information between system 500 and users.

Communication device 525 is coupled to bus 512 for accessing information from remote computers or servers through wide-area network. Communication device 525 may include a modem, a router, or a network interface device, or other similar devices that facilitate communication between computer 500 and the network. In one aspect, communication device 525 is configured to perform wireless functions. Alternatively, REI system 530 and communication device 525 perform the resource element categorization and soft demapping functions in accordance with one embodiment of the present invention.

The REI system 530, in one aspect, is coupled to bus 511 and is configured to perform resource element categorization on received uplink communications as described above to improve overall receiver performance. The REI system 530 comprises hardware, firmware, or a combination of hardware and firmware.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

What is claimed is:

1. A method for facilitating network communication, comprising:
   receiving one or more symbols from an uplink transmission, wherein receiving one or more symbols includes identifying resource elements containing data bits and uplink control information ("UCI") bits scattered throughout the resource elements for each symbol;
   categorizing the resource elements into a plurality of categories indexing some resource elements containing UCI and some resource elements containing data to generate categorized resource elements, wherein categorizing includes generating a first category containing data and second channel state information (CSI2), a second category containing acknowledgment (ACK) information, a third category containing first channel state information (CSI1); and
   forwarding the categorized resource elements to downstream processing functions for facilitating optional treatments.

2. The method of claim 1, wherein the symbols are received from a new radio (NR) uplink transmission.

3. The method of claim 1, further comprising soft-demapping the categorized resource elements based on their associated categories.

4. The method of claim 1, further comprising descrambling the categorized resource elements based on their associated categories.

5. The method of claim 1, further comprising combining and extracting uplink control information from the categorized resource elements.

6. The method of claim 1, further comprising calculating signal to interference noise ratios (SINR) for each category of the resource elements.

7. The method of claim 1, further comprising receiving the symbols from one of a layer demapper and a despreader.

8. An apparatus for facilitating network communication, comprising:
   an input interface that receives one or more symbols, wherein each symbol includes resource elements containing data bits and uplink control information ("UCI") bits wherein the UCI bits are scattered throughout the resource elements;
   a categorizer coupled to the input interface and configured to categorize the resource elements into a plurality of categories indexing some resource elements containing UCI and some resource elements containing data to generate categorized resource elements, wherein the categorizer generates a first category containing data and second channel state information (CSI2), a second category containing acknowledgment (ACK) information, a third category containing first channel state information (CSI1); and
   an output interface coupled to the categorizer and operable to output the categorized resource elements to downstream processing functions for facilitating optional treatments.

9. The apparatus of claim 8, wherein the symbols are received in a new radio (NR) uplink transmission.

10. The apparatus of claim 8, further comprising a soft-demapper that soft-demaps the categorized resource elements based on their associated categories.

11. The apparatus of claim 8, further comprising a descrambler that descrambles the categorized resource elements based on their associated categories.

12. The apparatus of claim 8, further comprising a combiner/extractor that combines and extracts uplink control information from the categorized resource elements.

13. The apparatus of claim 8, further comprising a calculator that calculates signal to interference noise ratios (SINR) for each category of the resource elements.

14. The apparatus of claim 8, wherein the input interface receives the symbols from one of a layer demapper and a despreader.

15. An apparatus for facilitating network communication, comprising:
   means for receiving one or more symbols from an uplink transmission, wherein means for receiving one or more symbols includes means for identifying resource elements containing data bits and uplink control information ("UCI") bits scattered throughout the resource elements for each symbol;
   means for categorizing the resource elements into a plurality of categories indexing some resource elements containing UCI and some resource elements containing data to generate categorized resource elements, wherein means for categorizing includes means for generating a first category containing data and second channel state information (CSI2), a second category containing acknowledgment (ACK) information, a third category containing first channel state information (CSI1); and means for forwarding the categorized resource elements to downstream processing functions for facilitating optional treatment.

16. The apparatus of claim 15, wherein means for receiving one or more symbols includes means for obtaining symbols received from a 5G uplink transmission.

\* \* \* \* \*